US 6,564,572 B1

(12) United States Patent
Uchimura et al.

(10) Patent No.: US 6,564,572 B1
(45) Date of Patent: May 20, 2003

(54) ABSORPTION REFRIGERATOR

(75) Inventors: Tomoyuki Uchimura, Kanagawa (JP);
Toshio Matsubara, Kanagawa (JP);
Akiyoshi Suzuki, Kanagawa (JP);
Tomoyoshi Irie, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/129,964

(22) PCT Filed: Nov. 21, 2000

(86) PCT No.: PCT/JP00/08205
§ 371 (c)(1),
(2), (4) Date: May 21, 2002

(87) PCT Pub. No.: WO01/38802
PCT Pub. Date: May 31, 2001

(30) Foreign Application Priority Data

Nov. 22, 1999 (JP) .......................................... 11-331662

(51) Int. Cl.[7] .............................................. F25B 15/00
(52) U.S. Cl. .......................................... 62/476; 62/484
(58) Field of Search ........................ 62/476, 478, 484, 62/267, 106, 101

(56) References Cited

U.S. PATENT DOCUMENTS

| 4,709,558 A | * | 12/1987 | Matsushita et al. | ............ | 62/480 |
| 5,205,137 A | * | 4/1993 | Ohuchi et al. | ................ | 62/484 |
| 6,247,331 B1 | * | 6/2001 | Nishiguchi et al. | ........... | 62/476 |

FOREIGN PATENT DOCUMENTS

| JP | 6-257891 | * | 9/1994 | .................. | 62/476 |
| JP | 10-300260 | | 11/1998 | | |
| JP | 2000-258084 | | 9/2000 | | |

OTHER PUBLICATIONS

JP, 9–280692, A (Osaka Gas Co., Ltd.), Oct. 31, 1997 (Oct. 31, 1997), p. 4, right column, lines 1–9 –See PCT Search Report.
JP, 5–118708, A (Osaka Gas Co., Ltd.), May 14, 1993 (May 14, 1993), Fig. 6. See PCT Search Report.
JP, 9–243279, A (Matsushita Electric Ind. Co., Ltd.), Sep. 19, 1997 (Sep. 19, 1997), Fig. 2. See PCT Search Report.
JP, 10–292955, A (Osaka Gas Co., ltd.), Nov. 4, 1998 (Nov. 4, 1998), Fig. 2. See PCT Search Report.

* cited by examiner

Primary Examiner—Melvin Jones
(74) Attorney, Agent, or Firm—Armstrong, Westerman & Hattori, LLP.

(57) ABSTRACT

There is provided an absorption refrigerator comprising a liquid-film type plate heat exchanger structure,. which is improved in terms of installation while maintaining the height of the refrigerator at a practical level.

In an absorption refrigerator utilizing a liquid-film type plate heat exchanger for an absorber (A), an evaporator (E), a regenerator (G) and a condenser (C), all the absorber, the evaporator, the regenerator and the condenser, each comprising the liquid-film type plate heat exchanger, are arranged in a horizontal direction. The evaporator, the absorber, the regenerator and the condenser are accommodated in a single can body (1), and the evaporator and the absorber, and the regenerator and the condenser are, respectively, accommodated in different chambers arranged in a lateral direction, which are divided by a partition wall (16) provided in the can body. The evaporator and the absorber, and the regenerator and the condenser may be, respectively, accommodated in different can bodies arranged in the lateral direction.

10 Claims, 8 Drawing Sheets

ABSORPTION REFRIGERATOR

TECHNICAL FIELD

The present invention relates to an absorption refrigerator. More specifically, the present invention is concerned with an absorption refrigerator in which liquid-film type plate heat exchangers are used for an absorber, an evaporator, a regenerator and a condenser.

TECHNICAL BACKGROUND

An absorption refrigerator is used for various applications, such as air conditioning, supply of cold or hot water., etc. Generally, when an absorption refrigerator is used for air conditioning for a building, it is installed in a basement or on a rooftop. Therefore, it is desired to minimize the volume of the refrigerator as well as the installation area.

This cannot be achieved, however, in an absorption refrigerator in which an evaporator, an absorber, a condenser and a regenerator each have a so-called shell-and-tube type heat exchanger structure, because such a refrigerator has a large volume relative to a heat transfer area. Therefore, a proposal has been made to use, as the evaporator, the absorber, the condenser and the regenerator, a plate type heat exchanger having a high heat transfer efficiency relative to a volume thereof, especially a film-liquid type plate heat exchanger.

However, differing from the shell-and-tube type heat exchanger in which the heat transfer area can be increased as desired by increasing the number of heat transfer tubes or increasing the length of the heat transfer tube (while maintaining the same height), the film-liquid type plate heat exchanger has a problem of imparting a large height to the refrigerator for the following reasons.

When the heat transfer area of the plate is increased by increasing the width of the plate, it is difficult to effect uniform flow of fluid across the entire width of the plate, thus lowering the heat transfer efficiency of the heat exchanger. To avoid such a lowering of the heat transfer efficiency, it is required to elongate the plate in a direction of flow of the fluid. Generally, the plate is vertically oriented so as to effect flow of the fluid efficiently in an upward or downward direction. Therefore, the height of the plate becomes large.

Another reason is as follows. It is assumed to use a liquid-film type plate heat exchanger in a generally rectangular form, in which a liquid supply device (in a rectangular form) is placed on (rectangular) liquid-film type plates for making flow of a liquid over surfaces of the plates. In such a liquid-film type plate heat exchanger, the width of the liquid supply device is required to be increased as the width of the plates is increased, even if the capacity of the heat exchanger is maintained constant. In other words, change in height of the plates does not require any substantial change in the capacity of the liquid supply device. From this point of view, the height of the plate type heat exchanger is made large.

Further, as compared to the shell-and-tube type heat exchanger, the heat-exchange part of the liquid-film type plate heat exchanger can be reduced in size as a whole. However, in a reservoir part for an absorption solution and a cooling medium provided below the absorber and the evaporator, a liquid level substantially varies according to a change in the concentration of the absorption solution. Therefore the height of the reservoir portion must be large.

The height of the absorption refrigerator becomes large mainly for the reasons mentioned above. However, especially when the refrigerator is installed in a basement or on a rooftop of a building for air conditioning, it is advantageous to minimize the height of the refrigerator, for transport and installation. A limit of a practical height of the refrigerator is considered to be about 2,000 mm.

In a so-called double-effect absorption refrigerator including a high-temperature regenerator, when the height of a low-pressure can body (a can body accommodating a low-temperature regenerator, a condenser, an absorber and an evaporator) becomes considerably larger than that of a high-temperature regenerator, much of the space in the refrigerator is wasted and the refrigerator is not suitable for practical use.

In view of the above, it is an object of the present invention to provide a compact absorption refrigerator using liquid-film type plate heat exchangers, in which the height of the refrigerator can be maintained at a practical level while the volume of the refrigerator as a whole is reduced.

DISCLOSURE OF THE INVENTION

In order to achieve the above-mentioned object, the present invention provides an absorption refrigerator comprising an absorber, an evaporator, a regenerator and a condenser, each having a structure of a liquid-film type plate heat exchanger, wherein the absorber, the evaporator, the regenerator and the condenser are arranged in a horizontal direction.

The evaporator, the absorber, the regenerator and the condenser may be accommodated in a single can body, and the evaporator and the absorber, and the regenerator and the condenser may be, respectively, accommodated in different chambers divided by a partition wall provided in the can body.

Specifically, each of the evaporator, the absorber, the regenerator and the condenser may comprise an assembly of parallel plates forming the liquid-film type plate heat exchanger, the plates being arranged in a front-to-rear direction relative to the front of the absorption refrigerator, and the evaporator, the absorber, the regenerator and the condenser may be arranged in a lateral direction.

Each of the evaporator, the absorber, the regenerator and the condenser may comprise an assembly of parallel plates forming the liquid-film type plate heat exchanger, the plates being arranged in a lateral direction relative to the front of the absorption refrigerator; the evaporator and the absorber may be arranged in a front-to-rear direction relative to each other and the regenerator and the condenser may be arranged in the front-to-rear direction relative to each other; and the evaporator and the absorber, and the regenerator and the condenser may be arranged in the lateral direction.

Further, the evaporator and the absorber, and the regenerator and the condenser may be, respectively, accommodated in different can bodies.

Further, each of the evaporator and the absorber may comprise an assembly of vertically oriented parallel plates forming the liquid-film type plate heat exchanger, the respective parallel plates of the evaporator and the absorber being arranged in an alternate fashion in the horizontal direction relative to each other, the evaporator and the absorber being formed as an integral structure.

Each of the regenerator and the condenser may comprise an assembly of vertically oriented parallel plates forming the liquid-film type plate heat exchanger, the respective parallel plates of the regenerator and the condenser being arranged in an alternate fashion in the horizontal direction relative to each other, the regenerator and the condenser being formed as an integral structure.

Cooling water can be supplied to the absorber and the condenser either in parallel or in series in this order.

BRIEF DESCRIPTION OF THE DRAWINGS

FIG. 1(a) is a front view, FIG. 1(b) is a left side view and FIG. 1(c) is a right side view.

FIG. 2(a) is a front view, FIG. 2(b) is a left side view and FIG. 2(c) is a right side view.

FIG. 3(a) is a front view, FIG. 3(b) is a left side view and FIG. 3(c) is a right side view.

FIG. 4(a) is a front view, FIG. 4(b) is a left side view and FIG. 4(c) is a right side view.

FIG. 5(a) is a front view, FIG. 5(b) is a left side view and FIG. 5(c) is a right side view.

FIG. 6(a) is a front view, FIG. 6(b) is a left side view and FIG. 6(c) is a right side view.

FIGS. 8(a) and 8(b) show arrangements of elements of a conventional absorption refrigerator. FIGS. 8(c) and 8(d) show arrangements of elements of an absorption refrigerator of the present invention.

DESCRIPTION OF EMBODIMENTS

Next, referring to the drawings, description is made with regard to embodiments of the present invention.

In the accompanying drawings, the present invention is applied to a water-cooling type single-effect absorption refrigerator. However, this does not limit the present invention. The present invention can be applied to various absorption refrigerators, such as a double-effect absorption refrigerator, a water cooling/heating apparatus, etc.

Figure 1:
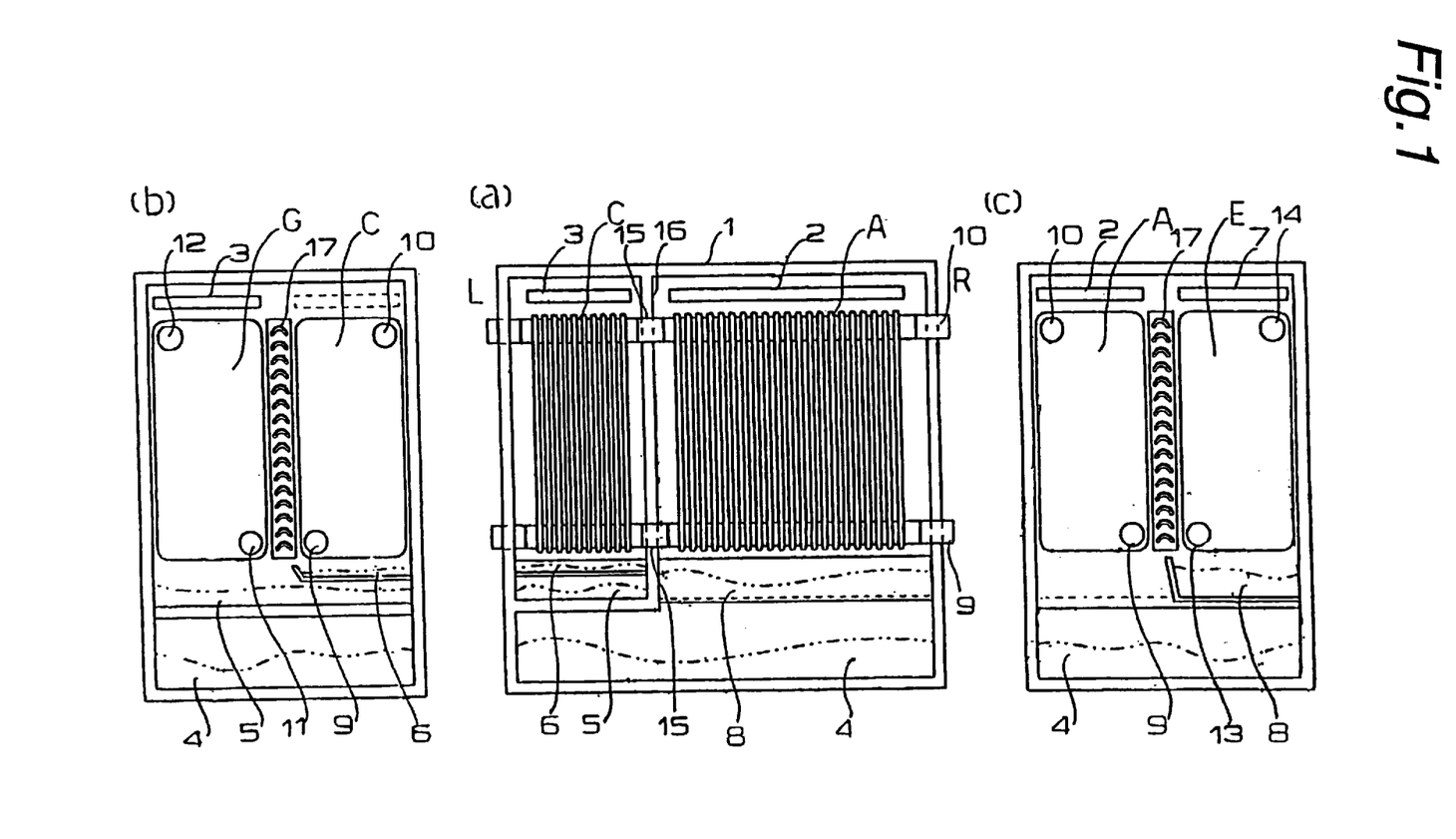
FIG. 1 shows a general arrangement of an absorption refrigerator of the present invention.

FIG. 1 shows a general arrangement of an absorption refrigerator of the present invention. FIG. 1(a) is a front view, FIG. 1(b) is a left side view and FIG. 1(c) is a right side view. In FIG. 1, reference character A denotes an absorber; E an evaporator; G a regenerator; and C a condenser. Reference numeral 1 denotes a can body of the absorption refrigerator; 2 a concentrated solution supply device; 3 a diluted solution supply device; 4 a diluted solution reservoir; 5 a concentrated solution reservoir; 6 a cooling medium reservoir; 7 a cooling medium supply device; 8 a cooling medium recovery device; 9 a cooling water inlet; 10 a cooling water outlet; 11 a heat source fluid inlet; 12 a heat source fluid outlet; 13 a cold water inlet; 14 a cold water outlet; 15 a communication tube; 16 a partition wall; and 17 a droplet separator (an eliminator).

In FIG. 1, each of the evaporator E, the absorber A, the regenerator G and the condenser C comprises a plurality of vertically oriented plates having the same height, which are arranged in parallel to each other in a lateral direction as viewed in FIG. 1(a). The evaporator E, the absorber A, the regenerator G and the condenser C are disposed horizontally relative to each other. They are spaced apart from each other in a front-to-rear or lateral direction, with the droplet separator 17 and the partition wall 16 being disposed therebetween.

Cooling water is supplied from the cooling water inlet 9 to the plates of the absorber A and the plates of the condenser C in parallel. When the plate of the absorber A and the plate of the condenser C have the same form, the ratio of the number of plates between the absorber and the condenser is preferably about 67:33 to about 60:40. The supply devices 2, 3 and 7 for a cooling medium and an absorption solution are disposed above the plates of the absorber A, the evaporator E and the regenerator G. The cooling medium recovery devices or reservoirs are disposed below the plates of the evaporator E and the condenser C.

A lower portion of the can body 1 forms the solution reservoir 4. In operation, a solution is stored in the reservoir 4 in a certain amount. A liquid level in the reservoir 4 varies, in accordance with operation conditions. However, during operation, the solution has a height such that it does not make contact with the cooling medium recovery device 8. When the refrigerator is stopped, the liquid level may be increased and make contact with the recovery device 8.

Depending on the temperature of cooling water, the absorption solution cannot be returned to a position above the absorber A under pressure in the regenerator G and the condenser C. This problem is solved in this embodiment by providing a spray pump at an outlet of a heat exchanger. The spray pump may be provided at an outlet of the regenerator G (an outlet of the low-temperature regenerator in the case of a double-effect absorption refrigerator).

Figure 2:
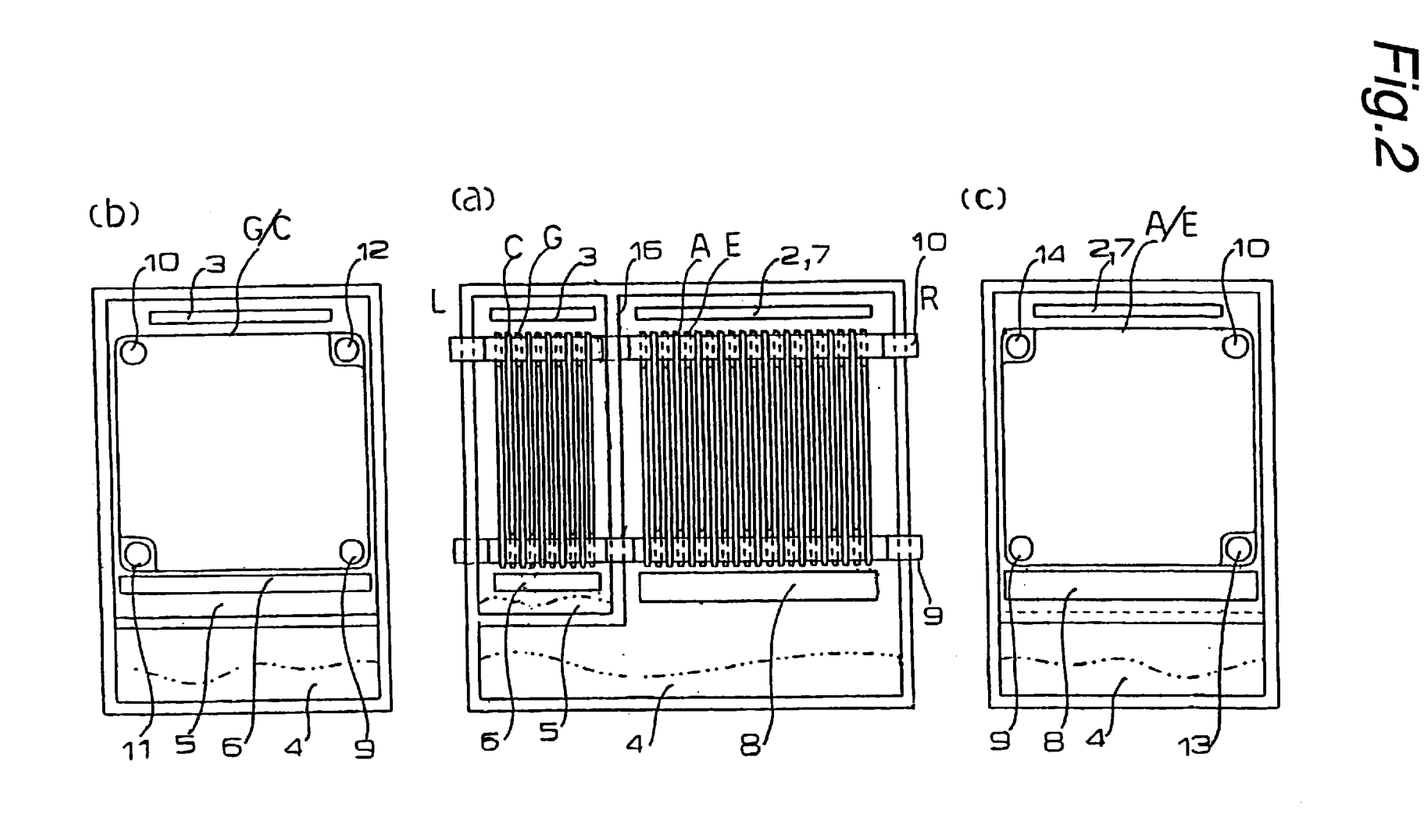
FIG. 2 shows a general arrangement of an absorption refrigerator according to another embodiment of the present invention.

FIG. 2 shows a general arrangement of an absorption refrigerator according to another embodiment of the present invention. FIG. 2(a) is a front view, FIG. 2(b) is a left side view and FIG. 2(c) is a right side view.

In FIG. 2, the refrigerator comprises an evaporator.absorber A/E integrally formed from the plates of the evaporator E and the plates of the absorber A, which are alternately arranged in parallel to each other in a lateral direction as viewed in FIG. 2, and a regenerator.condenser G/C integrally formed from the plates of the regenerator G and the plates of the condenser C, which are alternately arranged in parallel to each other in the lateral direction. The evaporator absorber A/E and the regenerator condenser G/C are disposed on the right side and the left side, respectively, with the partition wall 16 being provided therebetween. Cooling water is supplied to the plates of the absorber A and the plates of the condenser C in parallel.

The supply devices 2, 3 and 7 for a cooling medium and an absorption solution are disposed above the evaporator absorber A/E and the regenerator condenser G/C. The recovery devices 6 and 8 are disposed below the plates of the evaporator.absorber A/E and the regenerator.condenser G/C so as to recover the cooling medium separated from the absorption solution. The recovered cooling medium is stored in a cooling medium tank, which is provided separately from the can body, although such a cooling medium tank is omitted in FIG. 2. The cooling medium tank may be provided in the can body.

As in the case of FIG. 1, the lower portion of the can body forms the diluted solution reservoir 4. The same reference numerals and characters as used in FIG. 1 have the same meanings as used in FIG. 1.

FIGS. 3 to 6 show general arrangements of absorption refrigerators according to further embodiments of the present invention. In each of FIGS. 3 to 6, (a) is a front view, (b) is a left side view and (c) is a right side view.

Figure 3:
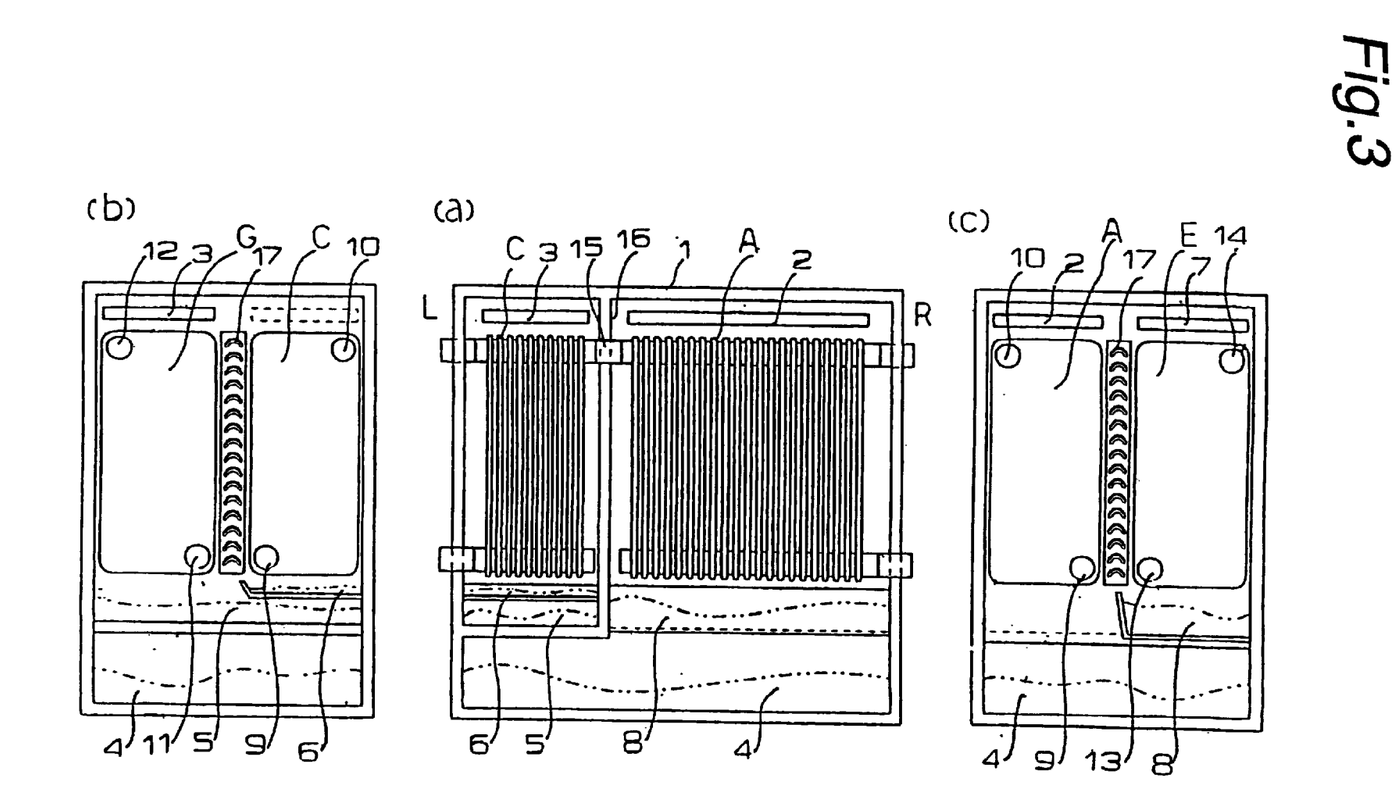
FIG. 3 shows a general arrangement of an absorption refrigerator according to a further embodiment of the present invention.

FIG. 3 differs from FIG. 1 only in that the supplying of cooling water to the absorber A and the condenser C is conducted in series, not in parallel as conducted in the refrigerator of FIG. 1. Cooling water supplied from the cooling water inlet 9 first passes through the absorber A, and is then guided to the condenser C through the communication tube 15.

Figure 4:
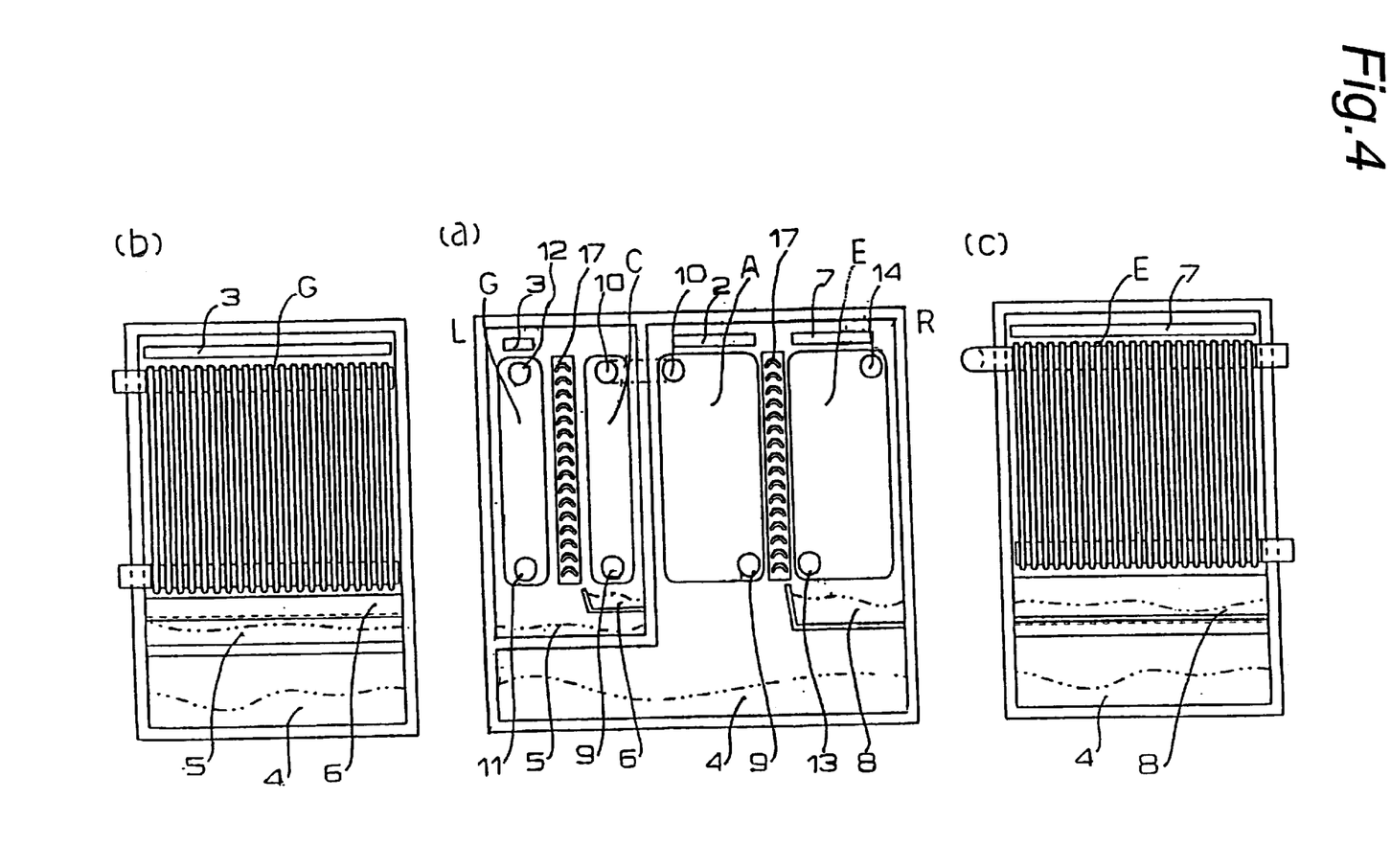
FIG. 4 shows a general arrangement of an absorption refrigerator according to a further embodiment of the present invention.

FIG. 4 shows the evaporator E, the absorber A, the regenerator G and the condenser C arranged laterally as viewed from the front of the refrigerator.

Figure 5:
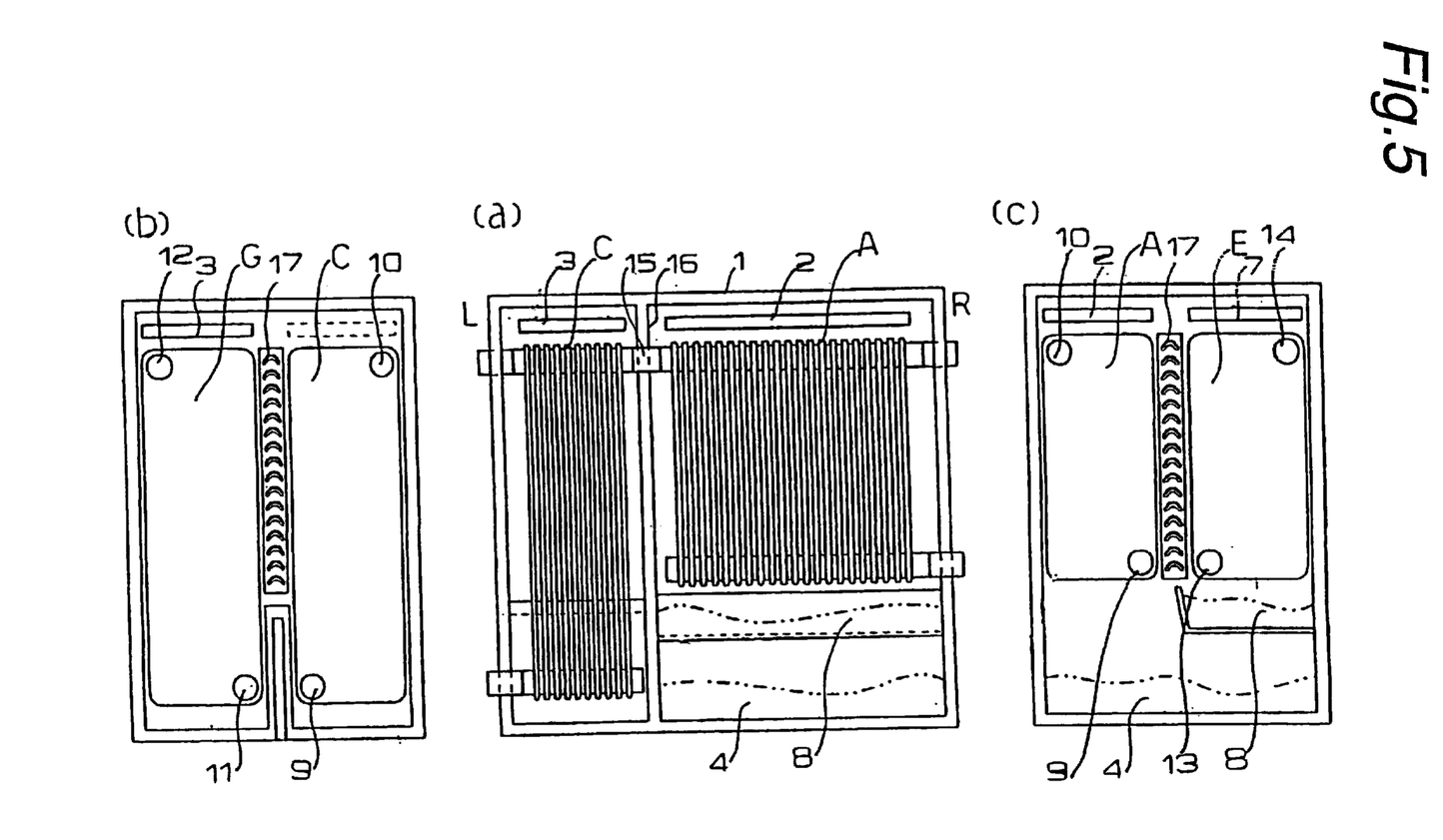
FIG. 5 shows a general arrangement of an absorption refrigerator according to a further embodiment of the present invention.

FIG. 5 shows an absorption refrigerator which is substantially the same as that of FIG. 3, except that the plates of the regenerator G and the condenser C are vertically elongated so as to increase the areas of the plates. With this arrangement, the number of plates can be reduced, to thereby reduce the size of the absorption refrigerator as a whole.

Figure 6:
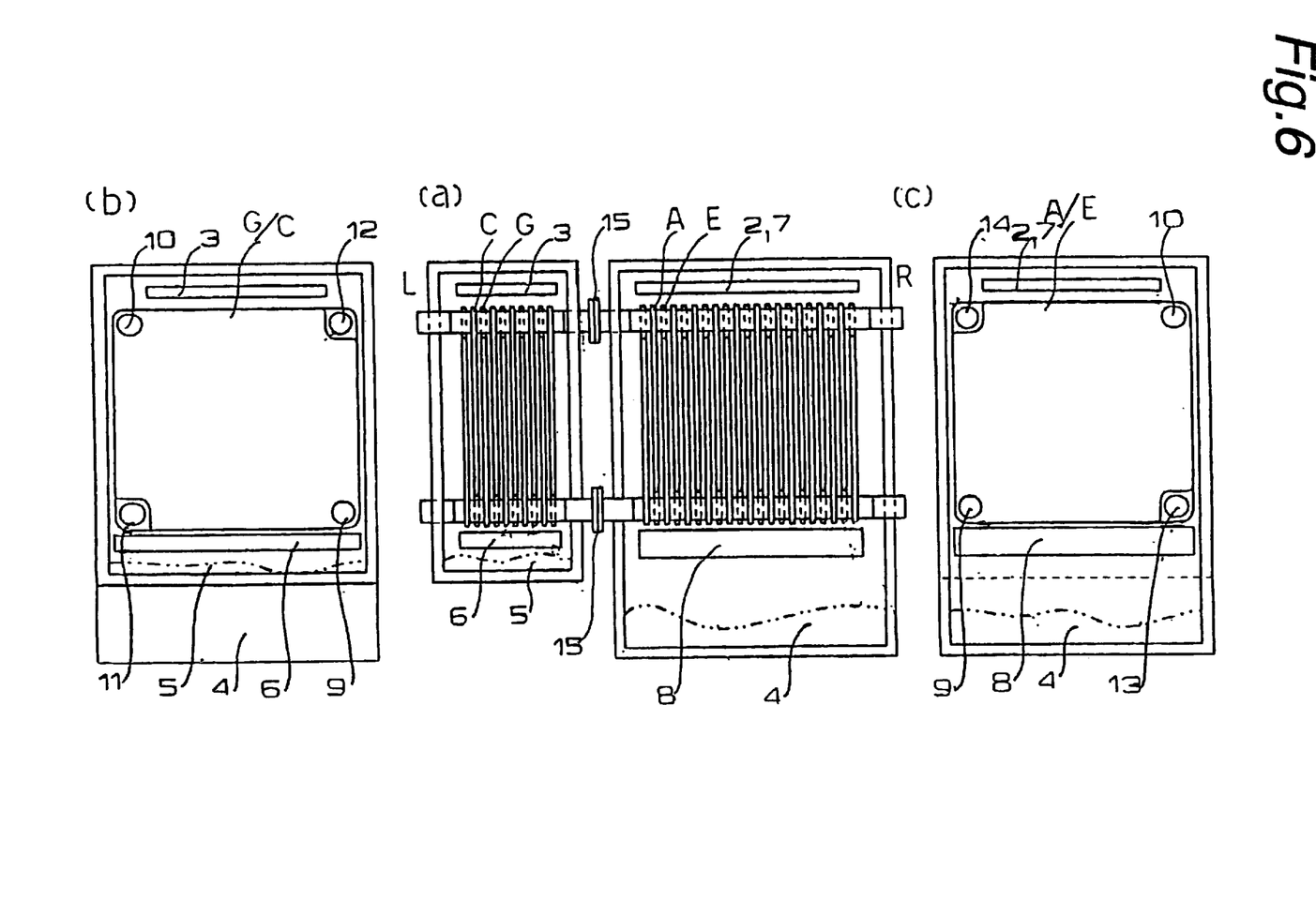
FIG. 6 shows a general arrangement of an absorption refrigerator according to a further embodiment of the present invention.

FIG. 6 shows an absorption refrigerator which is substantially the same as that of FIG. 2, except that the regenerator.condenser G/C, in which the plates of the regenerator G and the plates of the condenser C are alternately arranged in parallel to each other, and the absorber.condenser A/C, in which the plates of the absorber A and the plates of the evaporator E are alternately arranged in parallel to each other, are accommodated in different can bodies and connected through the communication tube 15.

Figure 7:
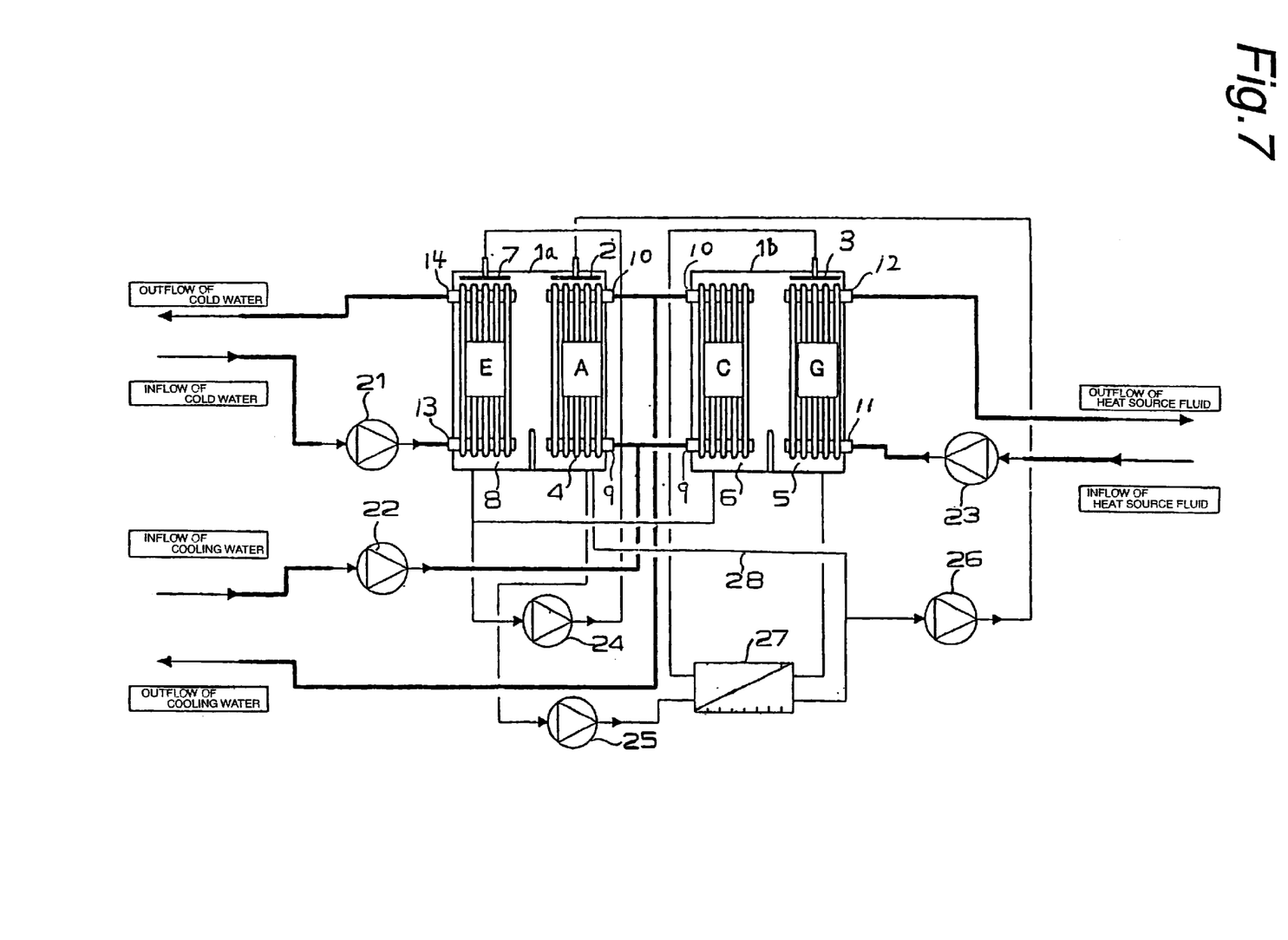
FIG. 7 is a system diagram indicating flow of liquid in the absorption refrigerator of FIG. 1.

FIG. 7 shows a system diagram indicating flow of liquid in the absorption refrigerator of the present invention.

FIG. 7 indicates flow of liquid in the absorption refrigerator of FIG. 1.

The absorber A and the evaporator E, and the regenerator G and the condenser C are accommodated in a can body 1a and a can body 1b, respectively. Cooling water is supplied from the cooling water inlet 9 into the plates of the absorber A and the plates of the condenser C and discharged from the cooling water outlet 10, by means of a cooling water pump 22. A heat source fluid is supplied from the heat source fluid inlet 11 into the plates of the regenerator G and discharged from the outlet 12, by means of a heat source fluid pump 23. Further, cold water is supplied from the cold water inlet 13 into the plates of the evaporator E and discharged from the outlet 14, by means of a cold water pump 21.

A diluted solution which has absorbed a cooling medium in the absorber A is circulated in such a manner as mentioned below. The diluted solution is supplied from the diluted solution reservoir 4 to a solution heat exchanger 27 by means of a solution circulating pump 25 and heated. The diluted solution is then introduced into the diluted solution supply device 3 disposed above the plates of the regenerator G and allowed to flow over the surfaces of the plates of the regenerator G which are heated by the heat source fluid. The cooling medium evaporates, to thereby concentrate the solution, and the concentrated solution is stored in the concentrated solution reservoir 5 disposed below the regenerator. The concentrated solution flows from the concentrated solution reservoir 5 through the heating side of the solution heat exchanger 27, and is introduced into the concentrated solution supply device 2 above the absorber A, by means of a solution spray pump 26. The solution is then allowed to flow over the surfaces of the plates of the absorber A which are cooled by the cooling water, and absorbs the cooling medium which has evaporated in the evaporator E. Thus, the solution is diluted and stored in the diluted solution reservoir 4. It is preferred that an inlet of the spray pump 26 and the diluted solution reservoir 4 be communicated with each other through a tube 28. This arrangement is effective for stabilizing the flow rate at the spray pump 26 and the absorber A.

On the other hand, the cooling medium which has evaporated in the regenerator G condenses on the plates of the condenser C which are cooled by the cooling water, and is stored in the cooling medium reservoir 6 disposed below the condenser C. The stored cooling medium joins the cooling medium which is circulating through the evaporator E, and is supplied to the cooling medium supply device 7 above the evaporator E by means of a cooling medium pump 24. The cooling medium is allowed to flow over the plates of the evaporator E, and evaporates while removing heat from the cold water flowing within the plates. The evaporated cooling medium is absorbed into the concentrated solution flowing over the plates of the absorber A.

The cooling medium which has not evaporated is recovered in the cooling medium recovery device 8 disposed below the evaporator, and returned to the cooling medium supply device 7 by means of the cooling medium pump 24.

Referring to FIGS. 8(a) to 8(d) as schematic diagrams, an effect of the present invention is explained below.

Figure 8:
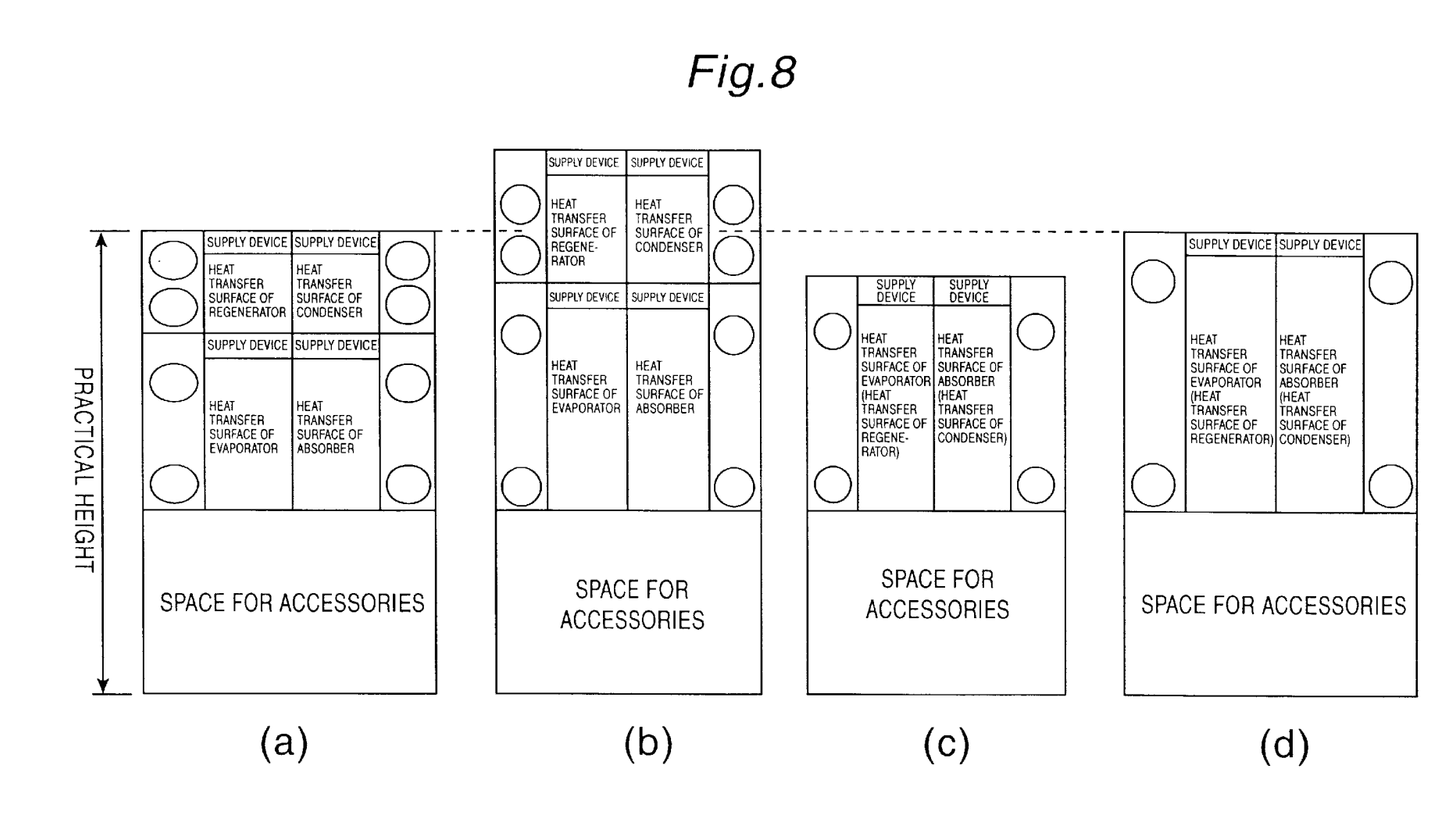
FIG. 8 is a schematic diagram showing an arrangement of elements of an absorption refrigerator.

FIG. 8 is a schematic diagram for comparison between conventional techniques (a) and (b) and embodiments (c) and (d) of the present invention. FIG. 8(a) is a schematic diagram of a conventional arrangement of elements of an absorption refrigerator having a practical height (for example, 2000 mm as mentioned above). FIG. 8(b) is a schematic diagram of a conventional arrangement of elements of an absorption refrigerator, in which the height of each plate is increased so as to obtain a sufficient heat transfer effect. FIG. 8(c) is a schematic diagram of an arrangement of elements of an absorption refrigerator according to the present invention. FIG. 8(d) is a schematic diagram of an arrangement of elements of an absorption refrigerator according to the present invention, in which the height of each plate is increased to a level such that the height of the refrigerator does not exceed a practical level.

In FIG. 8(a), the heat transfer plates of the regenerator and the condenser become flat relative to a lateral direction, and dimensions of the plate are not practical in terms of heat transfer characteristics and from the viewpoint of an effective heat transfer area. When the dimensions of the plate are made practical as shown in FIG. 8(b), the height of the absorption refrigerator is impractical.

In FIG. 8(c), the height of the refrigerator can be maintained at a practical level while maintaining a sufficient heat transfer performance of the heat transfer plates.

In FIG. 8(d), while maintaining the height of the refrigerator at a practical level, the heat transfer area is increased by elongating the heat transfer plates in a vertical direction as compared to the plates in FIG. 8(c). Consequently, the number of plates is decreased, to thereby reduce the size of the refrigerator as a whole. Further, as mentioned above, when the total area of the refrigerator including the liquid supply devices is the same, the heat transfer efficiency is higher in the refrigerator comprising heat transfer plates in a vertically elongated form. Therefore, the heat transfer performance can be increased by the arrangement of FIG. 8(d).

What is claimed is:

1. An absorption refrigerator comprising an absorber, an evaporator, a regenerator and a condenser, each having a structure of a liquid-film type plate heat exchanger, wherein the absorber, the evaporator, the regenerator and the condenser are arranged in a horizontal direction.

2. The absorption refrigerator according to claim 1, wherein the evaporator, the absorber, the regenerator and the condenser are accommodated in a single can body, and the evaporator and the absorber, and the regenerator and the condenser are, respectively, accommodated in different chambers divided by a partition wall provided in the can body.

3. The absorption refrigerator according to claim 1 or 2, wherein each of the evaporator, the absorber, the regenerator and the condenser comprises an assembly of parallel plates forming the liquid-film type plate heat exchanger, the plates being arranged in a front-to-rear direction relative to the front of the absorption refrigerator, and wherein the evaporator, the absorber, the regenerator and the condenser are arranged in a lateral direction.

4. The absorption refrigerator according to claim 1 or 2, wherein each of the evaporator, the absorber, the regenerator and the condenser comprises an assembly of parallel plates forming the liquid-film type plate heat exchanger, the plates being arranged in a lateral direction relative to the front of the absorption refrigerator, wherein the evaporator and the absorber are arranged in a front-to-rear direction relative to each other and the regenerator and the condenser are arranged in the front-to-rear direction relative to each other, and wherein the evaporator and the absorber, and the regenerator and the condenser are arranged in the lateral direction.

5. The absorption refrigerator according to claim 1, wherein the evaporator and the absorber, and the regenerator and the condenser are, respectively, accommodated in different can bodies.

6. The absorption refrigerator according to any one of claims 1, 2 or 5, wherein each of the evaporator and the absorber comprises an assembly of vertically oriented parallel plates forming the liquid-film type plate heat exchanger, the respective parallel plates of the evaporator and the absorber being arranged in an alternate fashion in the horizontal direction relative to each other, the evaporator and the absorber being formed as an integral structure.

7. The absorption refrigerator according to any one of claims 1, 2 or 5, wherein each of the regenerator and the condenser comprises an assembly of vertically oriented parallel plates forming the liquid-film type plate heat exchanger, the respective parallel plates of the regenerator and the condenser being arranged in an alternate fashion in the horizontal direction relative to each other, the regenerator and the condenser being formed as an integral structure.

8. The absorption refrigerator according to claim 6, wherein each of the regenerator and the condenser comprises an assembly of vertically oriented parallel plates forming the liquid-film type plate heat exchanger, the respective parallel plates of the regenerator and the condenser being arranged in an alternate fashion in the horizontal direction relative to each other, the regenerator and the condenser being formed as an integral structure.

9. The absorption refrigerator according to any one of claims 1, 2 or 5, wherein cooling water is supplied to the condenser and the absorber in parallel.

10. The absorption refrigerator according to any one of claims 1, 2 or 5, wherein cooling water is supplied to the absorber and the condenser in series in this order.

* * * * *